United States Patent
Hosoi et al.

[19]

[11] Patent Number: 6,095,552
[45] Date of Patent: Aug. 1, 2000

[54] STEERING WHEEL WITH AN INTEGRAL PAD PORTION

[75] Inventors: Akio Hosoi; Atsushi Nagata; Katsunobu Sakane, all of Aichi, Japan

[73] Assignee: Toyoda Gosei Co., Ltd., Aichi, Japan

[21] Appl. No.: 09/025,846

[22] Filed: Feb. 19, 1998

[30] Foreign Application Priority Data

| Feb. 20, 1997 | [JP] | Japan | 9-036295 |
| Mar. 10, 1997 | [JP] | Japan | 9-054920 |
| Mar. 10, 1997 | [JP] | Japan | 9-054924 |
| Mar. 10, 1997 | [JP] | Japan | 9-054925 |

[51] Int. Cl.[7] .................................................. B60R 21/16
[52] U.S. Cl. ......................................................... 280/731
[58] Field of Search ..................... 74/552, 558; 280/731, 280/728.3

[56] References Cited

U.S. PATENT DOCUMENTS

| 5,056,814 | 10/1991 | Shiraki et al. | 280/731 |
| 5,235,146 | 8/1993 | Suzuki | 280/61.54 |
| 5,383,682 | 1/1995 | Nagata et al. | 280/777 |
| 5,470,099 | 11/1995 | Williams | 280/728.2 |
| 5,615,910 | 4/1997 | Margetak et al. | 280/731 |
| 5,636,859 | 6/1997 | Williams et al. | 280/728.2 |
| 5,647,610 | 7/1997 | Nagata | 280/731 |
| 5,716,068 | 2/1998 | Sahara et al. | 280/731 |
| 5,782,140 | 7/1998 | Koyoma et al. | 74/552 |
| 5,802,718 | 9/1998 | Raetsen | 29/894.1 |

FOREIGN PATENT DOCUMENTS 2-133955   11/1990   Japan .

*Primary Examiner*—Kevin Hurley
*Assistant Examiner*—Kevin McKinley
*Attorney, Agent, or Firm*—Pillsbury Madison & Sutro LLP

[57] ABSTRACT

The cores of the spoke portions which extend to both right and left each comprises an outer portion and an inner portion. The outer portion and inner portion are coupled by a joint. The joint is coupled to the boss plate below the outer portions and centering on the steering shaft, it extends to both right and left. Each of the outer portions extends starting from the core of the ring portion at a point more forward than the steering shaft. The inner portions connecting the outer portions and the joint extend obliquely as seen in a plan view. While four connecting cores are provided to run along the edge profile of the pad portion, one of the connecting cores couples the two inner portions obliquely extending. The air bag device can be inserted through an opening formed by the joint and the like. Not only the stiffness of the coupled cores but also the stiffness of die casting molds is secured. Leather member is installed on part of the surface of the steering wheel. The cover of the ring portion has a groove formed on the border between the leather member and the exposed area on either side and the leather member is installed by fitting its edge portions into the grooves.

22 Claims, 11 Drawing Sheets

STEERING WHEEL WITH AN INTEGRAL PAD PORTION

BACKGROUND OF THE INVENTION

1. Field of the Invention

The present invention relates to a steering wheel, more particularly, to a steering wheel which has a pad portion formed integral with covers and which is furnished with an air bag device.

2. Description of the Related Art

Steering wheels generally comprise an annular ring portion, a pad portion provided in the center of the ring portion and a plurality of spoke portions extending from the ring portion toward the center of the steering wheel. Said ring portion comprises a core and its cover and, similarly, the spoke portions each comprise a core and its cover. The cores of the spoke portions are coupled at the distal end to a boss plate (boss), which is usually mounted on an end of the steering wheel by tightening with a nut.

The thus constructed steering wheel is such that the cores of the spoke portions and, hence, the boss which is an integral part of the main body of the steering wheel are mounted on the steering shaft by tightening with a nut and, subsequently, an air bag device and the like are installed and the pad portion is mounted from above.

In recent years, there was proposed a steering wheel which had the covers of the ring and spoke portions formed integral with the pad portion to eliminate the boundary between each of the covers and the pad portion (for example, Japanese Utility Model Publication No. Hei. 2-133955). According to this technology, the covers are made integral with the pad portion to achieve an improvement in the design of the steering wheel.

In spite of the improvement in design and the ensuring tendency toward the use of diverse external shapes, the steering wheel which has the covers formed integral with the pad portion suffers from the following problem during its mounting. Namely, the steering wheel which has the pad portion formed integral with the covers has no opening above the boss, thus making it impossible to place an air bag device and the like in position from above the boss.

On the other hand, the steering wheels are occasionally provided with leather members made of genuine or artificial leather which are installed typically on the surface of the core of the ring portion with a view to improving the wheel design. A common method of installing the leather member is by stitching its edge portions to the cover with a strand of high strength. Another approach that is also commonly employed is what is generally referred to as "closing"; according to this technique, grooves are formed in the cover of the ring portion and the edge portions of the leather member are fitted into the grooves so that it is installed in position.

However, this conventional art technique of "closing" has occasionally encountered a difficulty in forming sufficiently deep grooves in the cover of the ring portion on account of the core in said cover. This has caused the potential failure to secure the desired strength in the installation of the leather member.

In addition, the cover in which the grooves are formed is made of a soft resin material such as polyurethane foam, so it is easy to deform under external stress and has the disadvantage of suffering from deformation over time. This has caused the potential opening of the grooves during service. As a result, there has occurred the potential failure to secure the desired strength in the installation of the leather member, as well as the potential degradation in its external appearance and quality.

SUMMARY OF THE INVENTION

The present invention has been accomplished under these circumstances and its principal object is to provide a steering wheel which has a pad portion formed integral with the cover, and which is furnished with an air bag device, in which the stiffness of the coupled cores of spoke portions is secured, and the air bag device can be easily placed in position to improve the overall efficiency in mounting operations and can be inflated smoothly, additionally, the leather member secures the desired strength in installation and is protected against deterioration in its external appearance and quality.

According to a first aspect of the invention, there is provided a steering wheel comprising: a ring core being formed in a generally H-shaped cross section; a cover for covering the ring core and having a groove being formed in at least two sites of the cover such that it extends toward a recess of the H-shaped cross section of the ring core; and a leather member being installed by fitting its edge portions into the grooves so as to cover at least a part of a surface of the cover.

The grooves may be formed deep into corresponding sites of the recesses of the H-shaped cross section of the ring core.

According to the first aspect of the invention, the core of the ring portion is formed in a generally H-shaped cross section and a groove is formed in at least two sites of the cover such that it extends toward a recess on either side of the core, with the leather member being installed by fitting its edge portions into the grooves. Since the grooves thus extend toward the recesses in the core of the ring portion which is formed in a generally H-shaped cross section, they are formed sufficiently deep to ensure that the leather member is held firmly by means of the mass of the cover on both sides of each groove.

In addition, the mass of the cover on both sides of each groove is reinforced by means of the core of the ring portion which is formed in a generally H-shaped cross section. This offers the advantage that the grooves will not readily become wider even if an external stress is applied to their neighborhood. What is more, the grooves are less prone to deformation by the long time passage.

Further, the grooves may be formed deep into the corresponding sites of the recesses in the core of the ring portion. This offers the advantage of ensuring that the mechanism of action of the invention set forth in claim 1 is materialized more positively.

As summarized above, the steering wheel of the invention has a ring portion at least part of which is a leather member and offers the advantage that the leather member secures the desired strength in installation and is protected against deterioration in its external appearance and quality.

According to a second aspect of the invention, there is provided a steering wheel comprising: an annular ring core; a plurality of spoke cores, the spoke cores extending from the ring core toward its center; a joint to which at least two spoke cores are connected below the ring core, the joint being connected to a steering shaft; a connecting core for coupling two adjacent ones of the spoke cores; a cover for covering the ring core and spoke cores; a pad portion provided substantially above the joint in generally a center of the ring core, and being formed integrally with the cover; and an air bag device disposed between the pad portion and the joint, and being secured onto at least one of the joint, the spoke cores and the connecting core, wherein at least the connecting core is bent or curved such that an upper end of a cross section of the connecting core is directed toward the pad portion so as to secure a distance between the connecting core and the joint in a height direction, thereby securing a large enough area of an opening formed by the joint and the connecting cores, into which the air bag device is inserted.

In the aforementioned steering wheel, at least two connecting core are preferably provided on both sides in an inserting direction of the air bag device and the two connecting cores are bent or curved.

Further, the air bag device is to be secured by threading a screw into a hole formed in at least one of the spoke cores and the connecting core, and a screw boss for the hole projects above upper surface of the spoke cores and the connecting core so as to reduce a length of the screw boss hanging from a lower surface of the spoke cores and the connecting core, thereby securing a large enough area of the opening.

In the steering wheel according to the second aspect of the invention, the boss of the steering wheel is to be secured to a steering shaft. The steering wheel has a plurality of cores of spoke portions which extend from the core of a ring portion toward its center and a joint where at least two cores are connected below the core of the ring portion is connected to the boss. Two adjacent cores of the spoke portions are coupled together by a connecting core and this contributes to secure the stiffness of the coupled cores.

The air bag device is provided between the pad portion and the boss before the cores of the spoke portions and the like are secured to the steering shaft. A problem with this case is that the pad portion is formed integral with the covers of the ring portion and the spoke portions, so the air bag device cannot be placed in position from above the pad portion. The present invention solves this problem by placing the air bag device in position via the opening which is formed of the joint and the connecting core.

The greater the area of the opening, the more desirable it is for the insertion of the air bag device. Therefore, one may think of increasing the area of the opening by reducing the diameter of the connecting core no matter how slightly. But then the stiffness of the coupled cores of the spoke portions will decrease. The present invention deals with this problem by bending or curving the connecting core such that the upper end of its cross section is directed toward the pad portion. As a result, the distance between the connecting core and the joint in a height direction can be secured without sacrificing the strength of the connecting core and this contributes to secure a wide area of the opening formed by the joint and the connecting core.

Further, the bag holder can be fixed by threading screws into holes formed in at least one of the cores of the spoke portions and the connecting core. In addition, a screw boss for each of the holes projects above at least one of the cores of the spoke portions and the connecting core in which the holes are formed. As a result, an even greater distance can be secured between the underside of the screw boss and the joint and this contributes to secure an even wider area of the opening formed by the joint and the connecting core.

As summarized above, the steering wheel has a pad portion formed integral with the covers of a ring portion and spoke portions and is furnished with an air bag device; it is characterized in that the air bag device can be easily placed in position to improve the overall efficiency in mounting operations.

According to a third aspect of the invention, there is provided a steering wheel comprising: an annular ring core; a plurality of spoke cores, the spoke cores extending from the ring core toward its center, at least two spoke cores in the plurality of spoke cores, each comprising: an outer portion extending from the ring core at a point that is substantially forward than a steering shaft, and an inner portion extending from an inner end of the outer portion obliquely downward as seen in a plan view; a joint to which at least two the inner portions of the two spoke cores are connected below the ring core, the joint being connected to a steering shaft; a cover for covering the ring core and spoke cores; a pad portion provided substantially above the joint in generally a center of the ring core, and being formed integrally with the cover; a connecting core for coupling two adjacent ones of the inner portions of the spoke cores so as to run along an edge profile of the pad portion; and an air bag device disposed between the pad portion and the joint, and being secured onto at least one of the joint, the spoke cores and the connecting core.

The spoke cores are preferably formed of a die-casting metal.

According to the third aspect of the invention, the boss of the steering wheel is to be secured to a steering shaft. The spoke portions of the steering wheel have a plurality of cores which extend from the core of the annular ring portion substantially toward its center to be connected to the boss below the core of the ring portion.

The air bag device is provided below the pad portion before the cores of the spoke portion and the like are secured to the steering shaft. A problem with this case is that the pad portion is formed integral with the covers of the ring and spoke portions, so the air bag device cannot be placed in position from above the pad portion. The present invention solves this problem by designing the cores of the spoke portion such that at least two of them each comprises a general portion which extends from the core of the ring portion at a point that is more forward than the steering shaft, a connecting plate which extends to both right and left in a reference state to be coupled to the boss, and a joint which couples the connecting plate and the general portion to extend obliquely as seen in a plan view. Because of this arrangement, the air bag device can be inserted and placed in position via an opening formed by the connecting plate and the joint.

The steering wheel of the invention is also characterized by providing a connecting core which runs along the edge profile of the pad portion. With this structure, two cores of the spoke portion are eventually coupled together by the connecting core and this contributes to secure the stiffness of the coupled cores.

In addition, the connecting core for coupling the cores of the spoke portions interconnect two joints which extend obliquely as seen in a plan view. Compared to the case where the connecting core couples two elements of the general portion, the connecting core of the invention has the advantage of increasing the clearance formed between itself and each core of the spoke portions. As a result, the wall thickness of a mold for shaping the cores by die casting can be set at a sufficiently great value to secure the stiffness of the mold.

Further, the cores of the spoke portions can be formed of a die-casting metal. This ensures that the mechanism of action described above can be materialized positively.

As summarized above, the steering wheel of the invention has a pad portion formed integral with the covers of a ring portion and spoke portions and is furnished with an air bag device; it is characterized by the ease with which the air bag device can be placed in position.

The invention offers another advantage in that the stiffness of the coupled cores and, hence, the mold to be used in shaping by the casting can be sufficiently secured to provide higher durability.

According to a fourth aspect of the invention, there is provided a steering wheel comprising: an annular ring core; a plurality of spoke cores, the spoke cores extending from the ring core toward its center; a joint to which at least two spoke cores are connected below the ring core, the joint being connected to a steering shaft; a connecting core for coupling two adjacent ones of the spoke cores; a cover for covering the ring core and spoke cores; a pad portion provided substantially above the joint in generally a center of the ring core, and being formed integrally with the cover; an air bag device disposed between the pad portion and the joint, and being secured onto at least one of the joint, the spoke cores and the connecting core; a screw boss formed integrally with the connecting core at an exterior position thereof in view of an area in which an air bag of the air bag device is disposed.

The connecting core having the screw boss be preferably formed in a substantially straight line.

An end portion of a net insert buried in the pad portion may be secured to the connecting core.

The connecting core having the screw boss may be positioned at a hinge portion of the pad portion when the air bag is inflated.

In the present invention, the screw boss is disposed exterior to the connecting core. Hence, there is no likelihood for the inflating air bag to contact the screw boss although it is located inward of the connecting core.

Since the screw boss is located exterior to the connecting core, it will not narrow the space for accommodating the air bag device and the like, thereby eliminating the likelihood that it will interfere with the placement of the air bag device in position.

Further, the connecting core which may be at least provided with the screw boss is formed in a generally straight line. This ensures that the air bag is not prevented from being inflated smoothly even if it contacts the connecting core.

Further, in the case that the connecting core has secured thereto end portions of a net insert buried in the pad portion, the chance of the screw boss of interfering with the operation of securing the net insert to the connecting core is eliminated. In particular, in the case where the connecting core is formed in a generally straight line, wrinkles are less likely to develop in the net insert, thus allowing it to be secured to the connecting core even more efficiently. In addition, the net insert and the pad portion can be inflated smoothly as the air bag inflates.

The connecting core which is at least provided with the screw boss corresponds to a support (hinge portion) of the pad portion when the air bag is inflated. Because of this structure, the pad portion can be inflated more smoothly as the air bag inflates. This mechanism of action will be materialized even more positively particularly in the case where the connecting core is in a generally straight line.

As summarized above, the steering wheel of the invention has a pad portion formed integral with the covers of a ring portion and spoke portions and is furnished with an air bag device; it is characterized in that the stiffness of the coupled cores is secured and yet the air bag device can be easily placed in position without suffering from the problem of limited space and with the added capability of being inflated smoothly.

DETAILED DESCRIPTION OF THE PREFERRED EMBODIMENTS

An embodiment of the invention will now be described with reference to the accompanying drawings.

Figure 1:
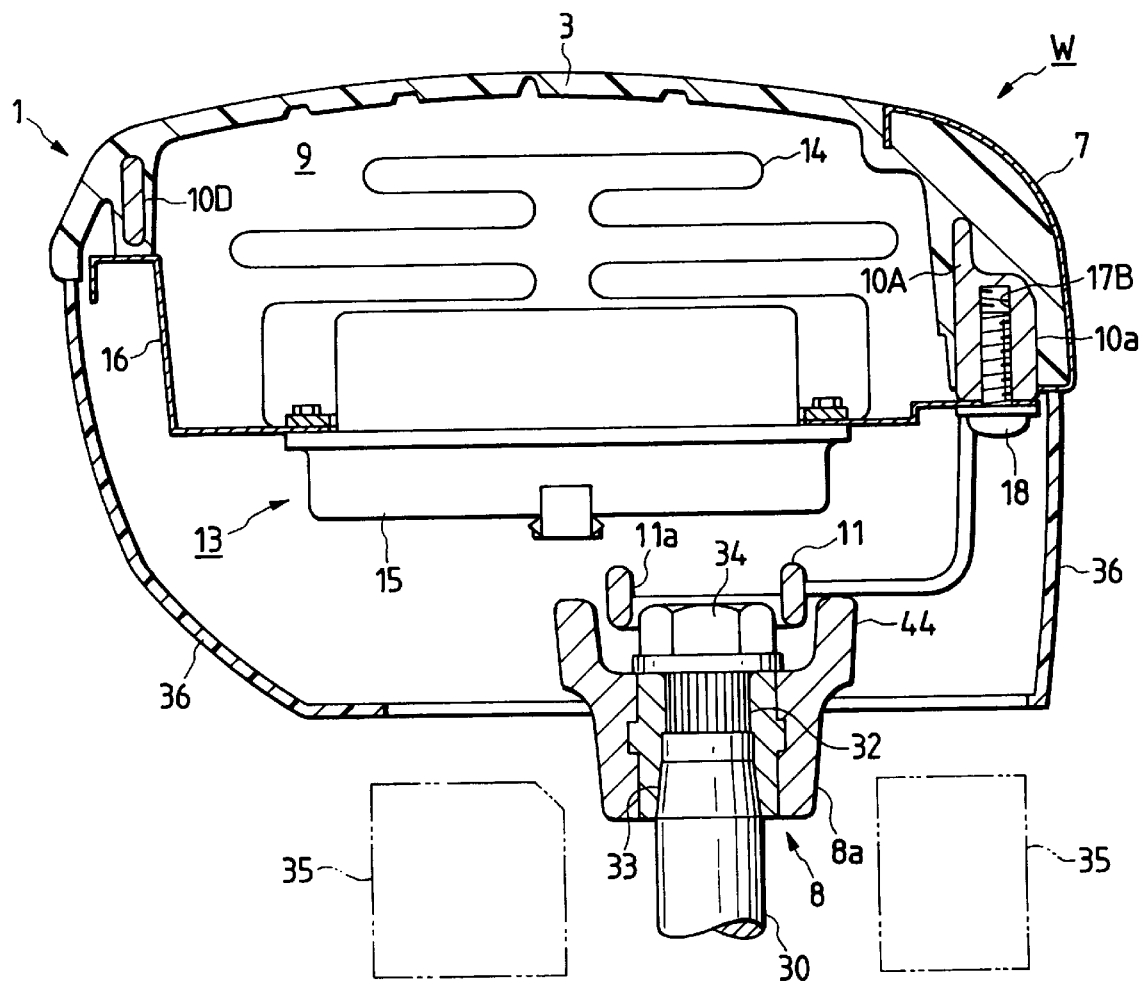
FIG. 1 shows a steering wheel according to an embodiment of the invention, which is a sectional view taken along a line K—K in FIG. 2.
Figure 2:
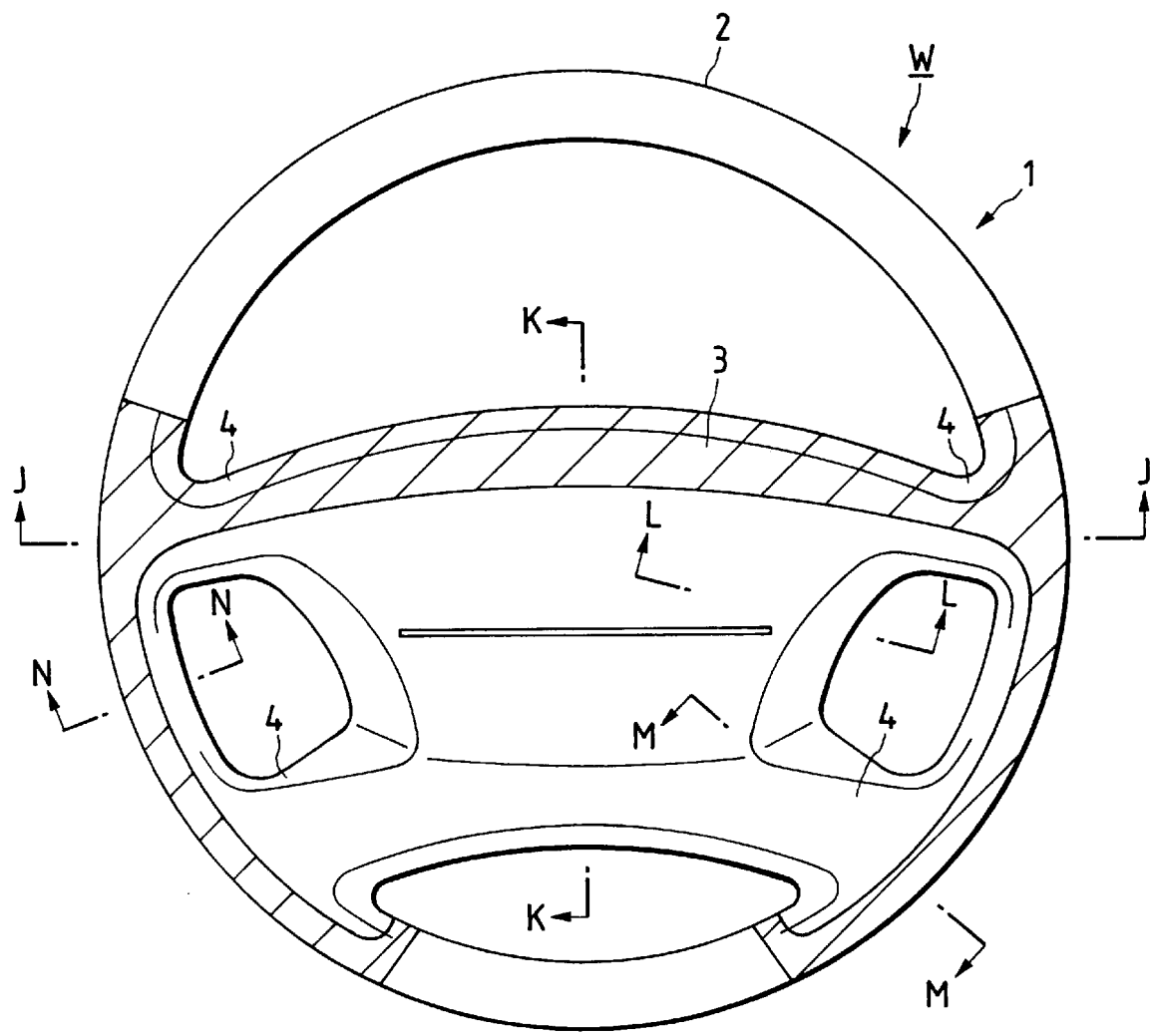
FIG. 2 is a plan view of the steering wheel according to an embodiment of the invention.
Figure 3:
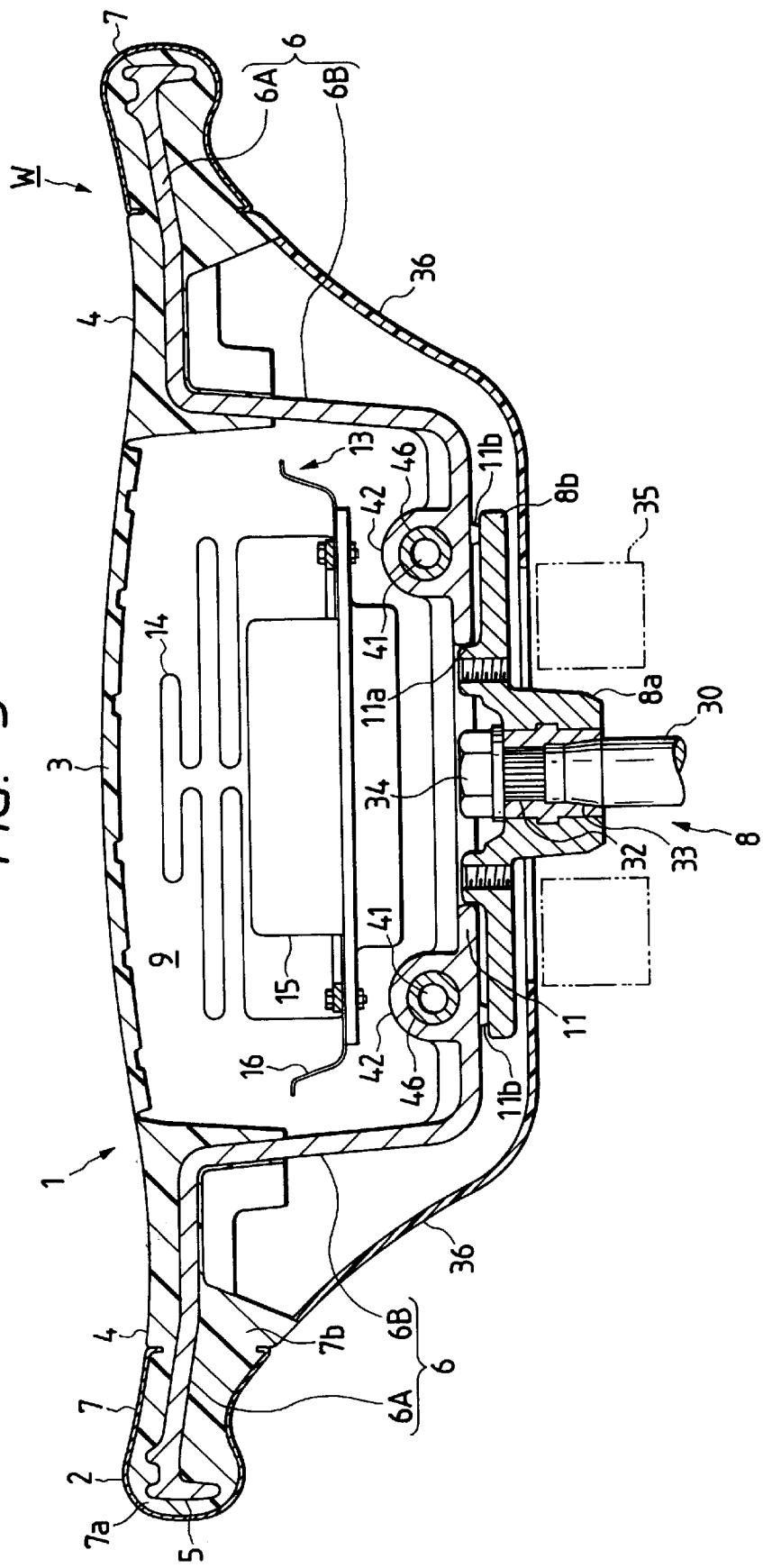
FIG. 3 is a sectional view taken along a line J—J in FIG. 2.

FIG. 2 is a plan view of a steering wheel W according to an embodiment of the invention. FIG. 3 is a sectional view taken along a line J—J in FIG. 2. FIG. 1 is a sectional view taken along a line K—K in FIG. 2.

As shown in FIG. 2, the main body 1 of the steering wheel W comprises an annular ring portion 2, a pad portion 3 provided in the center of the ring portion 2 and four spoke portions 4 connecting the ring portion 2 and the pad portion 3. As shown specifically in FIGS. 3 and 4, the ring portion 2 comprises a core 5 (ring core 5) typically made of a lightweight die-casting metal such as an aluminum alloy or a steel tube and its cover 7a, and the spoke portions 4 include four cores 6 (spoke cores 6) each made of a lightweight die casting metal such as an aluminum alloy and their covers 7b. The covers 7a and 7b and the pad portion 3 are formed integrally of a soft synthetic resin material (e.g. polyurethane foam). In the embodiment under consideration, four connecting cores 10A, 10B, 10C and 10D are provided to interconnect two adjacent ones of the four cores 6 of the spoke portions 4 (see FIG. 4). The connecting cores 10A, 10B, 10C, 10D are provided to run along the edge profile (outer periphery) of the pad portion 3.

A recess 9 is formed under the pad portion 3 to accommodate a switch plate and a membrane switch (which are not shown) and an air bag device 13. The membrane switch is fixed in position on the switch plate and has an upper and a lower thin plate which make part of a horn switch circuit (not shown) and contact each other when the pad portion 3 is depressed, thereby causing the horn to honk.

Figure 9:
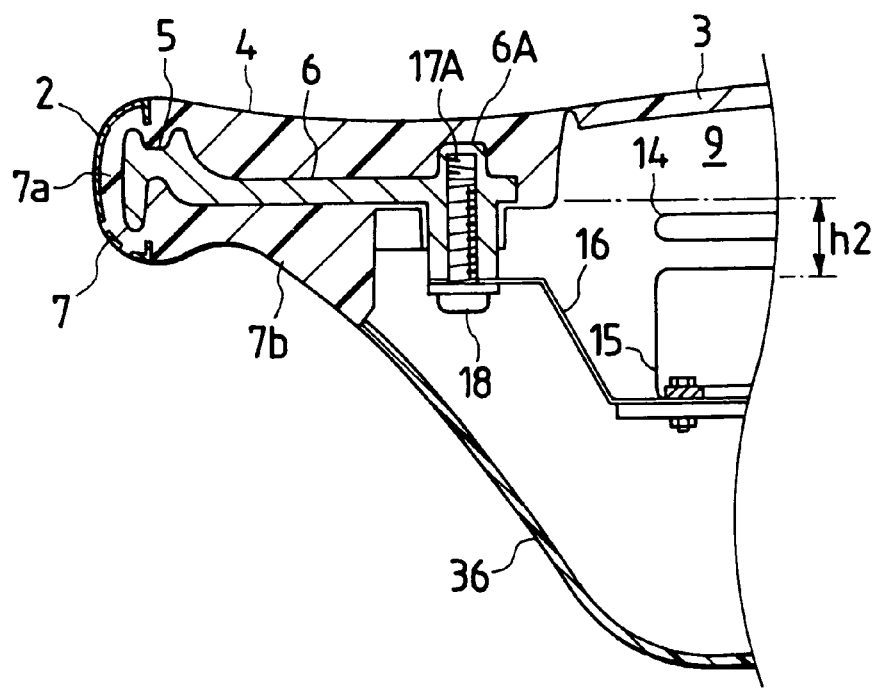
FIG. 9 is a sectional view taken along a line M—M in FIG. 2.

The air bag device 13 comprises a folded air bag 14, an inflator 15 for supplying the air bag 14 with an inflating gas and a bag holder 16 for retaining the air bag 14 and the inflator 15 in position. As shown in FIGS. 1 and 9, the bag holder 16 is fixed by a screw which is threaded not only into a hole 17A formed in a screw boss 6a in each of the cores 6 of the spoke portions but also into a hole 17B formed in a screw boss 10a in the connecting core 10A. A fabric-made net insert (not shown) is buried in the pad portion 3 in order to ensure that the latter is inflated consistently as the air bag 14 inflates. End portions of the net insert are secured to the connecting cores 10A and 10D.

Figure 4:
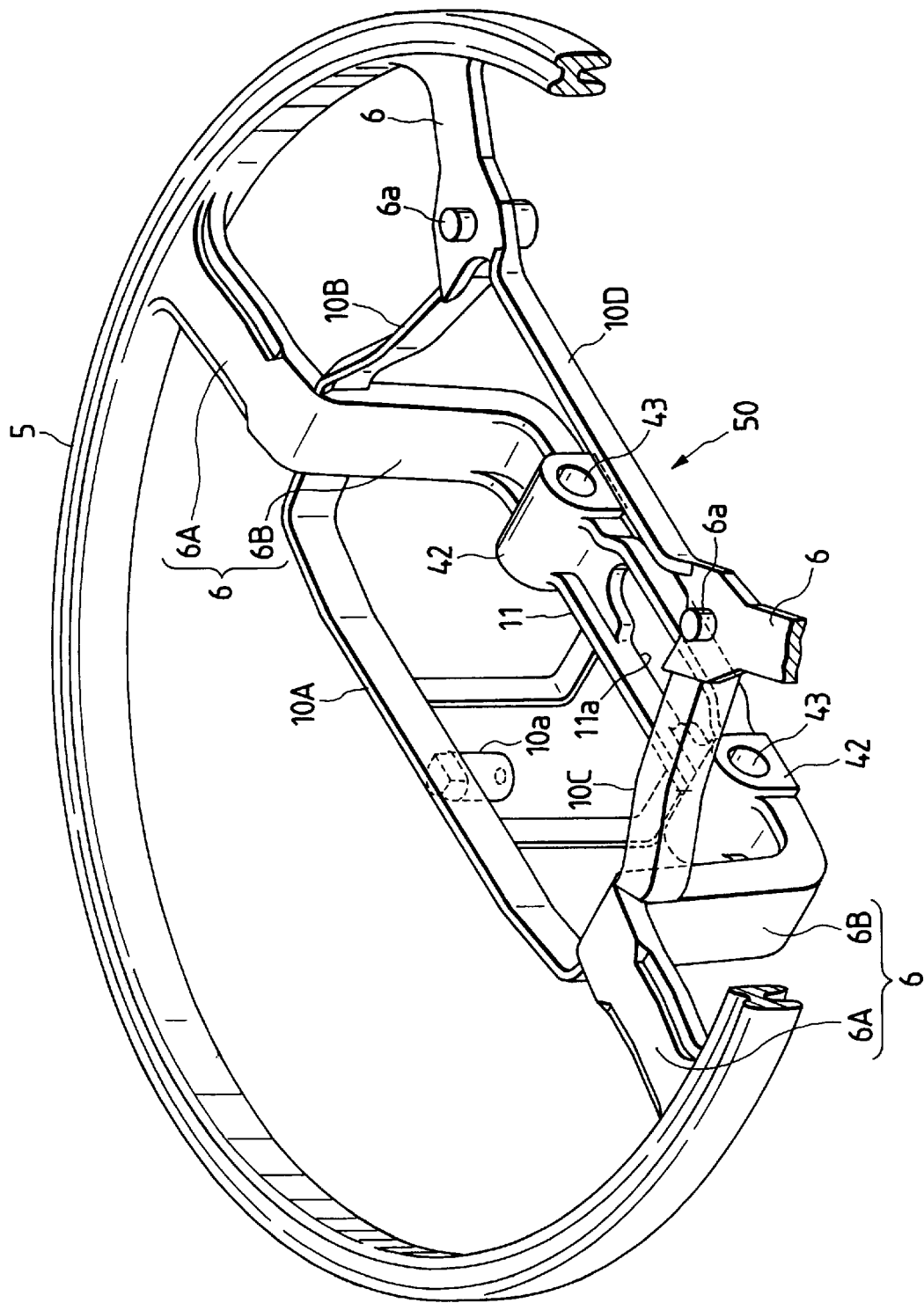
FIG. 4 is a perspective view showing the core portions of the steering wheel.
Figure 10:
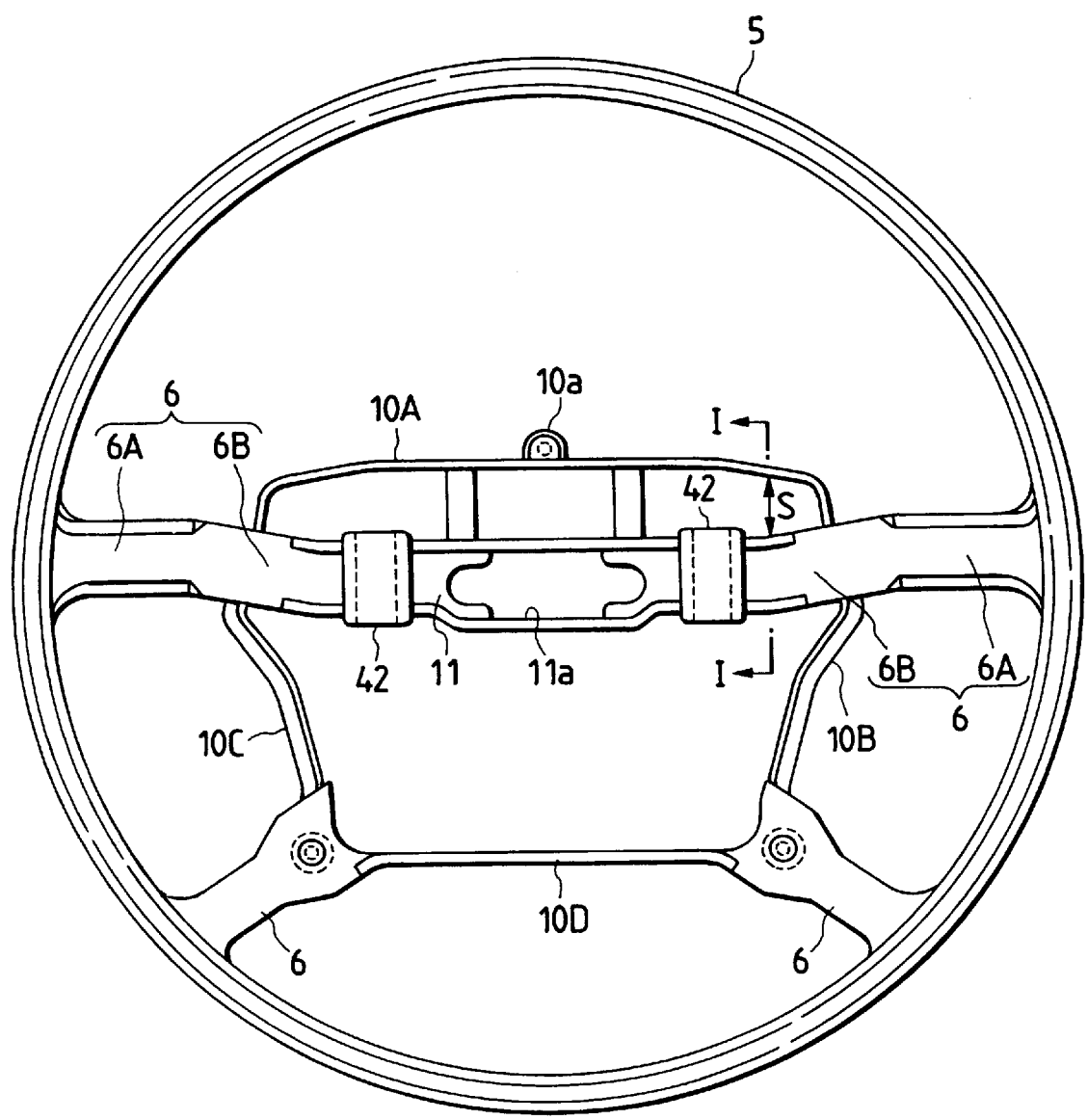
FIG. 10 is a plan view showing the core portions shown in FIG. 4.

As shown in FIGS. 3, 4 and 10, the four cores 6 of the spoke portions extend from the core 5 of the ring portion toward the center of the steering wheel. In the four cores 6, two opposed cores 6 have a portion extend from the core 5 of the ring portion at a point that is substantially forward than the steering shaft and covered with the cover 7b (which is hereinafter referred to as "an outer portion 6A"). In addition, each of the two opposed cores 6 has an inner portion 6B which is coupled to an inner end of the outer portion 6A and extends downward from the inner end of the outer portion 6A. The right and left inner portions 6B, 6B are coupled by a joint 11 which is provided at the center of the steering wheel W. The joint 11 has in the center a through-hole 11a for receiving a nut 34 to fasten a boss plate 8 (to be described below) and a steering shaft 30. At opposite ends of the through-hole 11a, there are formed a pair of retaining portions 42 through each of which a coupling bolt 41 is to be inserted when mounting the cores 6 of the spoke portions and the boss plate 8. Each of the retaining portions 42 is in a cylindrical form having a bolt inserting hole 43 formed horizontally and the two retaining portions 42 are provided parallel to each other.

Provided under the joint 11 is the boss plate 8 which is to be mounted on the steering shaft 30 to constitute a boss. The boss plate 8 includes a cylindrical part 8a which is to be secured to the steering shaft 30 and a top plate 8b which is provided on top of the cylindrical part 8a to fix the joint 11. A pair of retaining ribs 44 are erected parallel to each other on the top plate 8b. The two retaining ribs 44 are provided with bolt inserting holes 45 in alignment with the bolt inserting holes 43 (see FIG. 5).

We now describe the structure for mounting the boss plate 8 on the steering shaft 30. The steering shaft 30 has a male thread portion 31 provided at the distal end (see FIG. 7) and serrations 32 and a tapered surface 33 are provided below the male thread portion 31. The serrations 32 of the steering shaft 30 have a predetermined number of teeth, typically about 30 teeth. The cylindrical part 8a of the boss plate 8 has serrations and a tapered surface formed on the inner peripheral surface in such a manner that they correspond to the serrations 32 and tapered surface 33 of the steering shaft 30. The boss plate 8 is then slipped over the distal end of the steering shaft 30. The boss plate 8 is fastened to the steering shaft 30 by threading a nut 34 into engagement with the male thread portion 31 at the distal end of the shaft 30. A spiral cable 35 for relaying power to the air bag device 13 and the like is provided around the steering shaft 30. Resin-made lower covers 36 are provided around the boss plate 8 and secured to the top plate 8b by means of screws 37.

Figure 5:
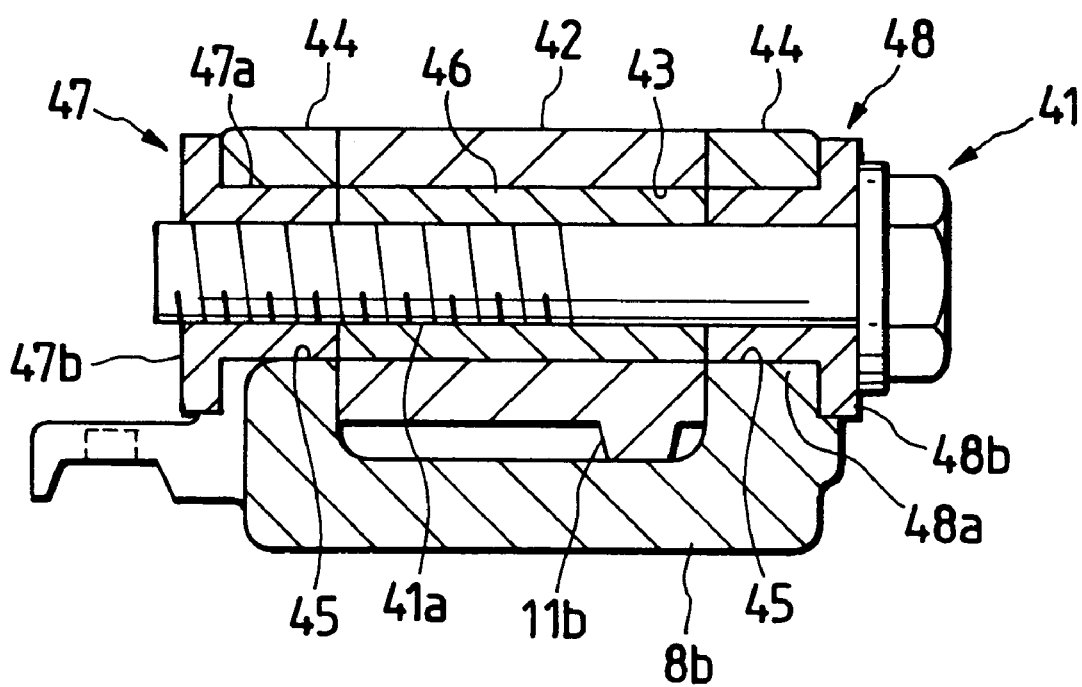
FIG. 5 is an enlarged sectional view showing how the retaining portion of the joint is mounted on the retaining ribs on the boss plate.

Let us now describe the structure for mounting the cores 6 of the spoke portions on the boss plate 8. FIG. 5 shows in section a bolt fastening portion in which the retaining rib 44 are fastened to the retaining portion 42 in order to mount the cores 6 of the spoke portions on the boss plate 8.

As shown, a collar 46 is fixed within the bolt inserting hole 43. The collar 46 is a cylindrical member made of a ferrous metal and its length is equal to the thickness of the retaining portion 42. The retaining portion 42 of the joint 11 is fitted between the two opposed retaining ribs 44 such that the bolt inserting hole 43 is in alignment with the bolt inserting holes 45. A projection 11b is formed integral with the underside of the joint 11 so that it helps the latter to be supported on the upper side of the top plate 8b of the boss plate 8.

The retaining rib 44 on the left side of FIG. 5 has a bush 47 fitted externally into the bolt inserting hole 45 and the rib 44 on the right side has another bush 48 fitted into the bolt inserting hole 45. Like the collar 46, both bushes 47 and 48 are made of a ferrous metal and have a cylindrical part (47a or 48a) and a flange (47b or 48b). The length of each cylindrical part is equal to the thickness of the retaining rib 44. When the bushes 47 and 48 are fitted into the bolt inserting hole 45, the flanges 47b and 48b are in engagement with the outer wall of the retaining rib 44 at two ends such that the cylindrical parts 47a and 48a will not go deeper than the limit defined by the thickness of the rib 44. The cylindrical part 47a of the bush 47 has a female thread portion formed on the inner circumference.

The coupling bolt 41 has a male thread portion 41a formed on the outer circumference. The bolt 41 is inserted through the bush 48 and into the collar 46 so that the male thread portion 41a is in threadable engagement with the female thread portion of the bush 47. As a result, both end faces of the retaining portion 42 are fastened by being urged between the inner surfaces of the retaining ribs 44. This in turn causes the joint 11 and, hence, the main body 1 of the steering wheel W to be mounted on the boss plate 8.

Another characterizing part of the embodiment under consideration will now be described.

As shown in FIGS. 1, 4 and 10, the screw boss 10a is formed integral with the exterior of the connecting core 10A. The connecting cores 10A and 10D are formed in a generally straight line. In addition, these cores correspond to a support of the pad portion 3 when the air bag 14 inflates. In other words, the pad portion 3 is adapted to inflate using the connecting cores 10A and 10D as a base (hinge portion) when the air bag 14 inflates.

Figure 8:
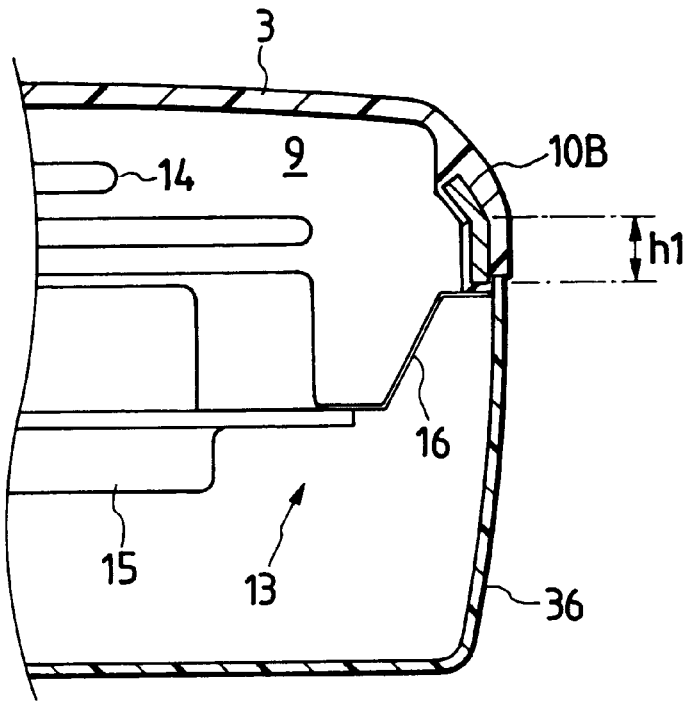
FIG. 8 is a sectional view taken along a line L—L in FIG. 2.

As shown in FIGS. 4 and 8, the connecting cores 10B and 10C on the right and left sides of the steering wheel are not in a flat form but are bent by some degree. Stated specifically, the upper part of the cross section of the connecting core 10B (or 10C) is bent toward the pad portion 3, namely, inward so that it conforms to the sectional profile of the pad portion 3. Because of this structure, the lower part of the cross section of the connecting core 10B (or 10C) has a comparatively small height h1.

As shown in FIGS. 4 and 9, the screw bosses 6a formed in the cores 6 of the spoke portions in order to fix the bag holder 16 in position project beyond the upper side of the cores. Because of this structure, the screw boss 6a hangs from the lower end face of the core 6 by a comparatively small dimension h2.

Figure 7:
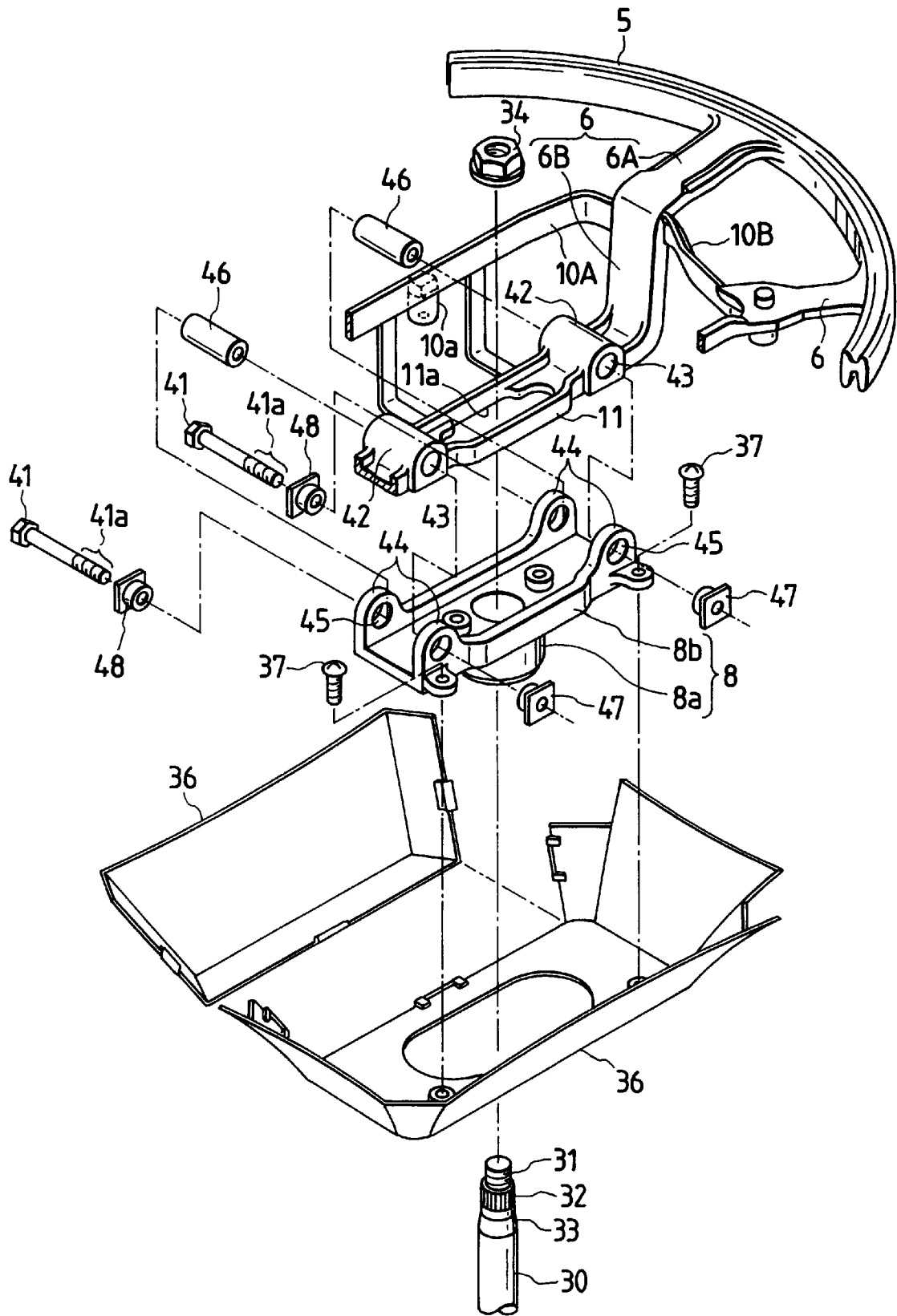
FIG. 7 is an exploded perspective view showing how the main body of the steering wheel is mounted on the boss plate and the steering shaft.

As shown in FIGS. 4, 7 and 10, the joint 11 for connecting the opposed cores 6 of the spoke portions is provided at the center which coincides with the steering shaft 30 and it extends linearly both to right and left in a reference state (at a steer angle of zero). The outer portions 6A of the cores 6 of the spoke portions start from an area of the core 5 of the ring portion at a point more forward than the steering shaft 30 and extend substantially parallel to the joint 11. Given this construction, the inner portion 6B which couples the joint 11 and each of the outer portions 6A extends obliquely as seen in a plan view.

While the connecting cores 10A to 10D are provided to run along the edge profile of the pad portion 3, the connecting core 10A is located at the most forward point and couples the inner portions 6B which extend obliquely as seen in a plan view. In other words, the connecting core 10A extends from a point halfway of each inner portion 6B.

We next describe the procedure of mounting the steering wheel W on the steering shaft 30.

The first step is to slip the boss plate 8 over the distal end of the steering shaft 30, with care being taken to ensure that the serrations 32 of the steering shaft 30 mesh with the serrations formed on the inner circumference of the cylindrical part 8a of the boss plate 8 (see FIG. 7). With this condition maintained, the nut 34 is brought into engagement with the male thread portion 31 of the steering shaft 30 so that the boss plate 8 is secured to it.

Subsequently, the lower covers 36 are placed in position so as to surround the boss plate 8.

Figure 11:
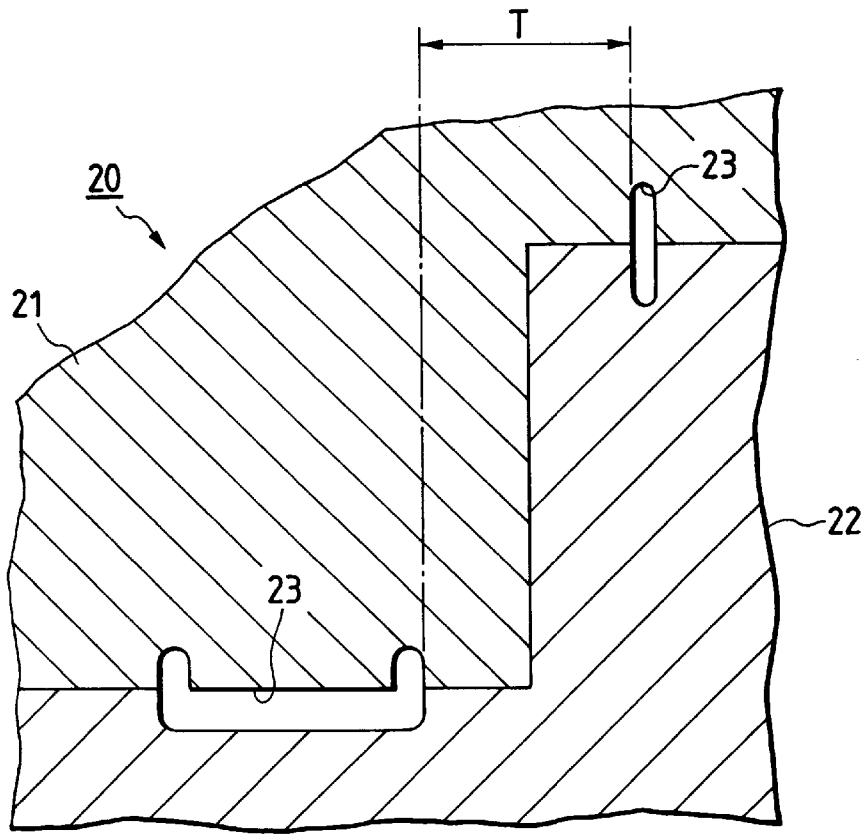
FIG. 11 is an enlarged sectional view of the essential parts of a mold apparatus to be used in forming the cores by die casting.

In a separate step, the main body 1 of the steering wheel W is mounted in place. Stated more specifically, not only the cores and like components of the main body 1 of the steering wheel but also the air bag device 13 and the like are provided. As for the cores and the like, the core 5 of the ring portion, the cores 6 of the spoke portions and the like are molded by die casting. Die casting may be performed using a mold apparatus generally indicated by 20 in FIG. 11. As shown, the mold apparatus 20 comprises a first mold 21 and a second mold 22. The two molds 21 and 22 define cavities 23 for shaping the core 5 of the ring portion and the cores 6 of the spoke portions. Note that the cavities 23 in FIG. 11 provide areas for shaping the joint 11 and the connecting core 10A (as represented in section I—I in FIG. 10).

When molten aluminum is cast into the cavities 23 and subsequently cooled to solidify, the cores 5 and 6 can be obtained by die casting.

Subsequently, the cores obtained by die casting are surrounded by coatings of covers 7a and 7b. This is accomplished simultaneously with the molding of the pad portion 3.

Subsequently, the lower covers 36 are placed in position so as to surround the boss plate 8.

Figure 6:
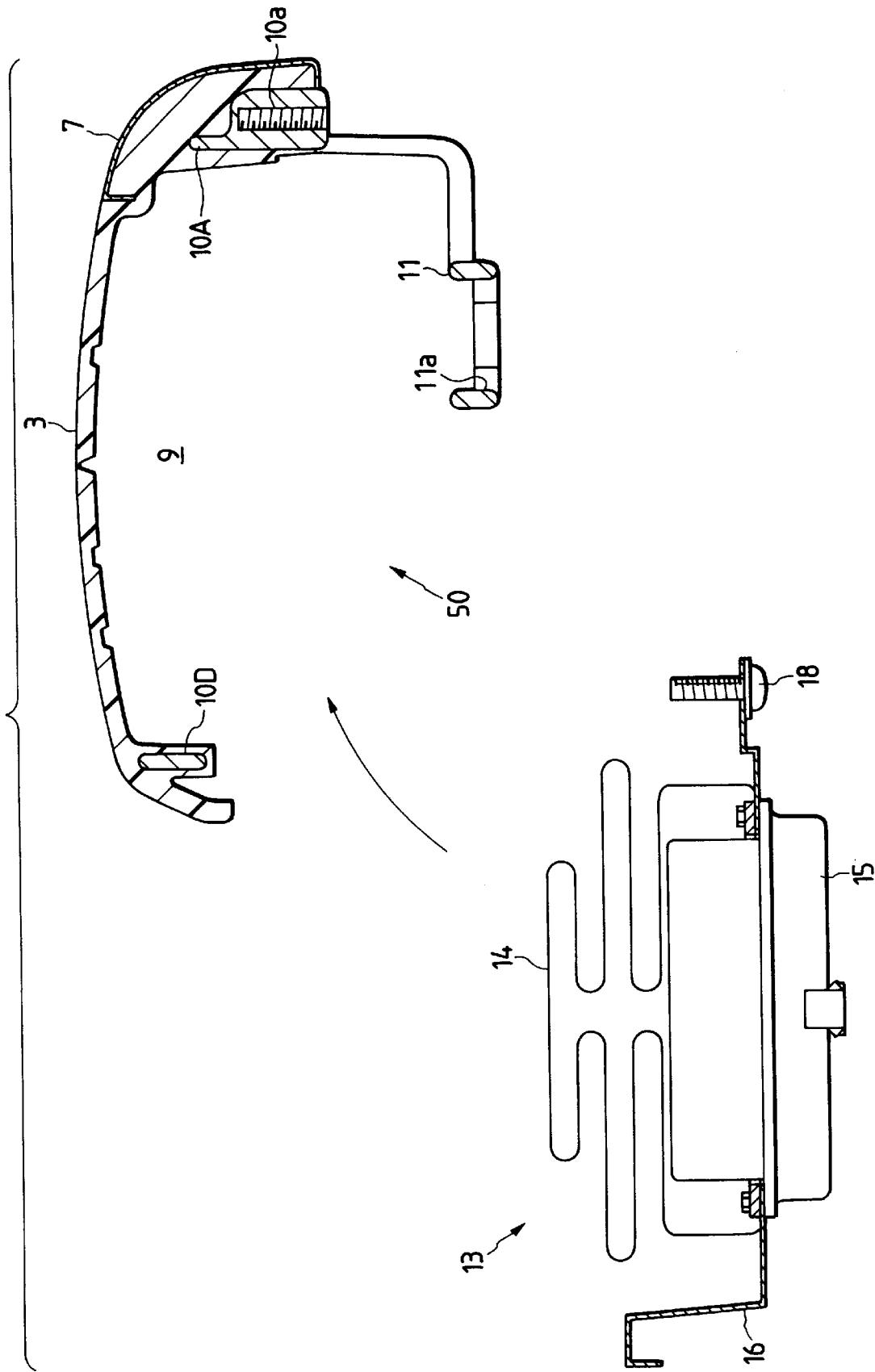
FIG. 6 is an exploded sectional view showing how an air bag device and the like are mounted on the main body of the steering wheel.

In a separate step, the main body 1 of the steering wheel W is mounted in place. Stated more specifically, the air bag 14, the inflator 15 and the bag holder 16 are assembled to form the air bag device 13 and, in addition, the switch plate and the membrane switch are fixed to the bag holder 16. Then, as shown in FIG. 6, the air bag device 13 and the like (including the switch plate and the membrane switch as integral part) are inserted into the recess 9 via an opening 50 which is located on the side of the cores 6 of the spoke portions that is closer to the driver and which is formed by the joint 11 and the connecting cores 10B, 10C and 10D. The bag holder 16 is then fixed within the recess 9 by means of the screws 18 and the like.

In the next step, the thus mounted main body 1 of the steering wheel W (including the air bag device 13 and the like) is placed on the boss plate 8 in position. Prior to this step, the collars 46 were already provided within the bolt inserting holes 43 and the bushes 47 and 48 were provided on retaining the ribs 44. Then, as shown in FIG. 7 (from which the air bag device 13 and the like are omitted for the sake of convenience), the main body 1 of the steering wheel W is placed on the boss plate 8 in position so that the joint 11 of cores 6 of the spoke portions is in registry with the top plate 8b of the boss plate 8. In other words, each of the retaining portions 42 is fitted between the retaining ribs 44 such that each bolt inserting hole 43 is in alignment with the associated bolt inserting holes 45.

Subsequently, the coupling bolt 41 is inserted through the bush 48 and into the collar 46 so that the male thread portion 41a of the bolt 41 is in threadable engagement with the female thread portion of the bush 47. As a result, both end faces of the retaining portion 42 are firmly secured by being urged between the inner surfaces of the retaining ribs 44. This in turn causes the joint 11 and, hence, the main body 1 of the steering wheel W to be mounted on the boss plate 8, whereupon the mounting of the steering wheel W is completed.

In the embodiment under consideration, the surface of the main body 1, more specifically, the surface of the cover 6a of the ring portion 2, the surfaces of the covers 7b of the spoke portions 4 and the surface of the pad portion 3 are such that a leather member 7 made of genuine leather (as hatched in FIG. 2) is installed on part of each surface. The leather member 7 is installed by a technique commonly referred to as "closing". In the embodiment under consideration, the leather portion 7 is installed in selected areas, whereby the main body 1 has such an external appearance that the leather member 7 mixes with those areas where the soft synthetic resin material is exposed.

Figure 12:
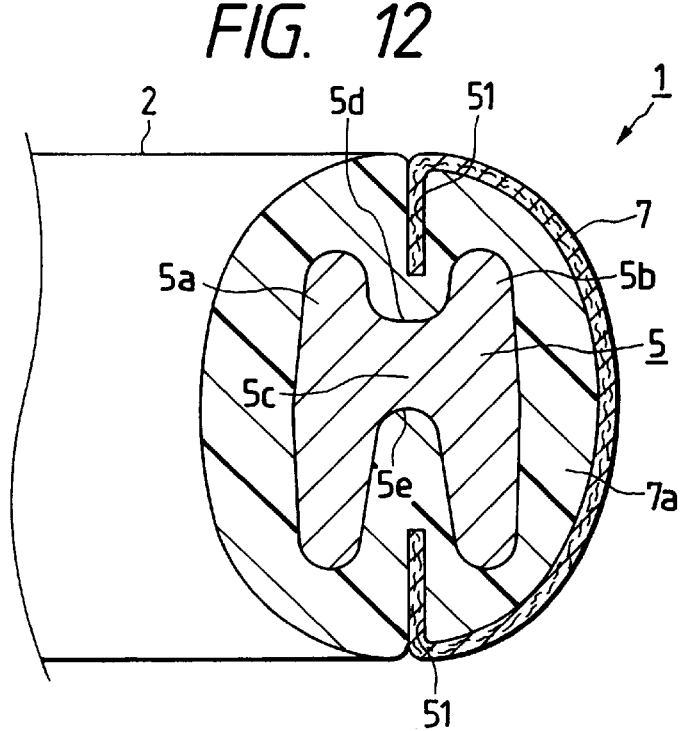
FIG. 12 is a sectional view taken along a line N—N in FIG. 2 showing a ring portion of the steering wheel.
Figure 13:
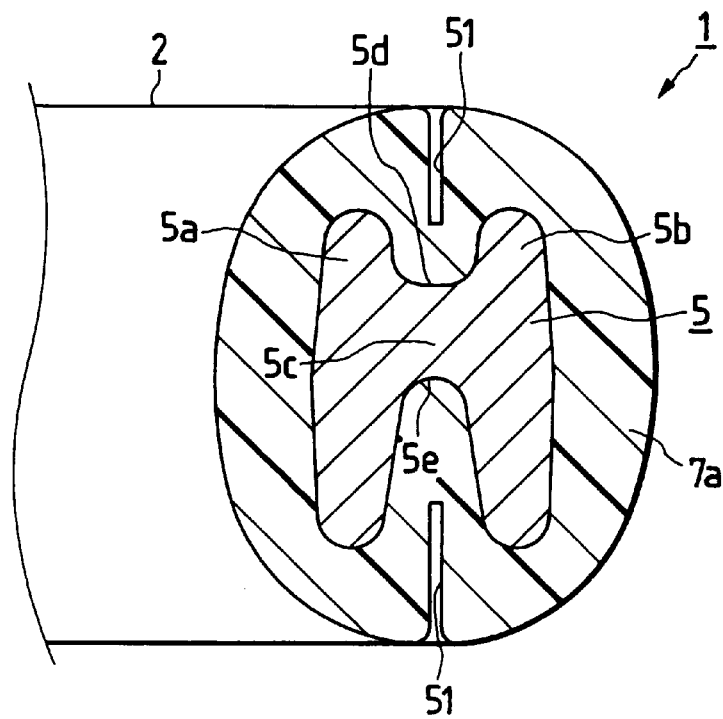
FIG. 13 is a sectional view of the ring portion which is yet to be furnished with a leather member.

As shown in FIGS. 12 and 13, the cover 7a of the ring portion 2, the covers 7b of the spoke portions 4 and the pad portion 3 each have a groove 51 formed on the border between the leather member 7 and the area where the soft synthetic resin material is exposed. The leather member 7 is installed by fitting its edge portions into grooves 51. In addition, an adhesive is provided between the inner surface of each groove 51 and the corresponding edge portion of the leather member 7 to ensure that not only the covers 7a and 7b but also the pad portion 3 are firmly joined to the leather member 7.

Another feature of the embodiment under consideration is that the core S of the ring portion 2 is formed in a generally H-shaped cross section. Thus, the core 5 of the ring portion 2 comprises three basic parts, an inner body 5a and an outer body 5b which have a cross section similar to a vertical wall, and a joint 5c which couples the two vertical bodies 5a and 5b together in the center of their height as seen in FIG. 12. These three parts of the core 5 define two recesses 5d and 5e on and beneath the joint 5c.

In addition, the grooves 51 are formed deep into the corresponding sites of the recesses 5d and 5e.

We next describe the mechanism of action of the embodiment under consideration, as well as the advantages it offers.

In the embodiment under consideration, the air bag device 13 and the like are accommodated within the recess 9 under the pad portion 3 before the main body 1 of the steering wheel 1 incorporating the cores 6 of the spoke portions and the like is fixed to the steering shaft 30. A problem with this case is that the pad portion 3 is formed integral with the covers 7a and 7b, so the air bag device 13 and the like cannot be placed in position from above the pad portion 3. In the embodiment under consideration, the present invention solves this problem by permitting the air bag device 13 and the like to be placed in position via the opening 50 which is formed by the joint 11 and the connecting cores 10B, 10C and 10D. As a result, the air bag device 13 and the like can be easily placed in position even in a steering wheel W which has the pad portion 3 formed integral with the covers 7a and 7b.

In the embodiment under consideration, the connecting cores 10A to 10D for coupling adjacent cores 6 of the spoke portions are provided to run along the edge profile of the pad portion 3. Because of this structure, the stiffness of the coupled cores is secured by the connecting cores 10A to 10D.

Further, the bag holder 16 is fixed by means of the screw 18 which is threaded not only into the hole formed in each of the screw bosses 6a in the cores 6 of the spoke portions but also into the hole 17B formed in the screw boss 10a in the connecting core 10A. In the embodiment under consideration, the screw boss 10a in the connecting core 10A is formed integral with its exterior. Hence, there is no likelihood for the inflating air to contact the screw boss 10a although it is located inward of the connecting core 10A. This ensures smooth inflation of the air bag 14.

Since the screw boss 10a is located exterior to the connecting core 10A, it will not narrow the space of the recess 9 for accommodating the air bag device 13 and the like, thereby eliminating the likelihood that it will interfere with the placement of the air bag device 13 in position. In other words, the problem of limited space availability can be avoided.

Besides the provision of the screw boss 10a exterior to the connecting core 10A, the embodiment under consideration is characterized in that the connecting cores 10A and 10D are formed in a generally straight line. This ensures that the air bag 14 is not prevented from being inflated smoothly even if it contacts the connecting cores 10A and 10D. As a result, the mechanism of action and the resulting advantage that are set forth can be realized more positively.

Although end portions of the net inset buried in the pad portion 3 are secured to the connecting cores 10A and 10D, the operation of securing the net insert to these connecting cores is not interfered with by the screw boss 10a since the latter is provided exterior to the connecting core 10A. In particular, in the embodiment under consideration, the connecting cores 10A and 10D are formed in a straight line, so wrinkles are less likely to develop in the net insert, thus allowing it to be secured to the connecting cores 10A and 10D more efficiently. In addition, the net insert and the pad portion 3 can be inflated smoothly as the air bag 14 inflates.

In addition, the connecting cores 10A and 10D correspond to a support of the pad portion when the air bag 14 is inflated. In other words, the pad portion 3 is adapted to inflate using the connecting cores 10A and 10D as a base (hinge portion) when the air bag 14 inflates. This offers the advantage that the pad portion 3 can also be inflated smoothly as the air bag 14 inflates. In particular, the connecting core 10A which is formed in a generally straight line contributes to ensure that the above-described mechanism of action and the resulting advantage can be realized even more positively.

In addition, the forward connecting core 10A couples two inner portions 6B which extend obliquely as seen in a plan view. Compared to the case where the connecting core 10A couples two elements of the outer portion 6A, the connecting core 10A used in the embodiment under consideration has the advantage of increasing the clearance S formed between itself and each core of the spoke portions (comprising the inner portion 6B and joint 11) as shown in FIG. 10. Hence, the molds 21 and 22 for shaping the cores by die casting (see FIG. 11) can be designed to have an increased setting of wall thickness T. As a result, the need to reduce the wall thickness of the molds 21 and 22 which has to be met if the clearance S is small and, hence, the potential damage to these molds can be minimized. In other words, the stiffness of the molds 21 and 22 can be sufficiently secured to provide higher durability.

Furthermore, the core 5 of the ring portion and the cores 6 of the spoke portions used in the embodiment under consideration are formed by die casting of aluminum. This contributes to reduction in the weight of the coupled cores and, hence, the steering wheel W taken as a whole.

Further, as already mentioned, the greater the area of the opening 50, the more desirable it is for the insertion of the air bag device 13 and the like. Therefore, one may think of increasing the area of the opening by reducing the diameter of the connecting cores 10B and 10C no matter how slightly. A problem with this case is that the stiffness of the coupled cores of the spoke portion will decrease. In the embodiment under consideration, the present invention solves this problem by adapting the right connecting core 10B and the left connecting core 10C to extend not in a flat form but bent by some degree. In other words, the upper part of the cross section of each of the connecting cores 10B and 10C is bent inward to conform to the sectional profile of the pad portion 3. Because of this structure, the lower part of the cross section of each of the connecting cores 10B and 10C has a comparatively small height h1. Consequently, the distance between each of the connecting cores 10B and 10C and the joint 11 in a height direction can be secured without sacrificing the strength of these connecting cores and this, in turn, contributes to secure a wide area of the opening 50.

As a result, the stiffness of the coupled cores of the spoke portion is secured and yet the air bag device 13 and the like can be easily placed in position to improve the overall efficiency in mounting operations.

In addition, the bag holder 16 is fixed by the screw 18 which is threaded not only into the hole 17A formed in the screw boss 6a in each of the cores 6 of the spoke portions but also into the hole 17B formed in the screw boss 10a in the connecting core 10A. In the embodiment under consideration, the screw bosses 6a formed in the cores 6 of the spoke portions project beyond the upper side of the cores. Because of the structure, the screw boss 6a hangs from the lower end face of the core 6 by a comparatively small dimension h2. As a result, an even greater distance can be secured between the underside of the screw boss 6a and the joint 11 and this contributes to secure an even wider area of the opening 50. As a consequence, the mechanism of action and the resulting advantage that are set forth can be realized more positively.

Still further, in the embodiment under consideration, the core 5 of the ring portion 2 is formed in a generally H-shaped cross section and, in addition, the groove 51 is formed in such a way that it extends toward the recesses 5d and 5e in the core 5. The leather member 7 is installed by fitting its edge portions into the grooves 51. Since the grooves 51 thus extend toward the recesses 5d and 5e in the core 5 of the ring portion 2 which is formed in a generally H-shaped cross section, they are formed sufficiently deep to ensure that the leather member 7 is held firmly by means of the mass of the cover 7a on both sides of each groove 51. As a result, the leather member 7 secures the desired strength in installation.

In addition, the mass of the cover 7a on both sides of each groove 51 is reinforced by means of the inner and outer bodies 5a and 5b of the core 5 of the ring portion 2 which is formed in a generally H-shaped cross section. This offers the advantage that the grooves 51 will not readily become wider even if an external stress is supplied to their neighborhood. What is more, the grooves 51 are less prone to deformation over time. This is an added mechanism by which the leather member 7 secures the desired strength in installation.

Further in addition, the leather member 7 is protected against deterioration in its external appearance and quality since the grooves 51 are less likely to deform.

Other feature of the embodiment under consideration is that the adhesive is provided between the inner surface of each groove 51 and the corresponding edge portion of the leather member 7. This combines with the aforementioned mechanism of action to secure a sufficiently large areas of adhesion to provide even greater strength in installation. As a result, the above advantage can be achieved more positively.

Yet another feature of the embodiment under consideration is that the grooves 51 are formed deep into the corresponding sites of the recesses 5d and 5e in the core 5 of the ring portion 2. As a result, the mechanism of action and the resulting advantages that are described above can be realized more positively.

It should be noted that the present invention is by no means limited to the embodiment described above and it may partly be modified as appropriate and implemented as follows without departing from the scope and spirit of the invention.

In the above embodiment, the steering wheel W has four spoke portions 4; alternatively, the invention may be embodied as a type having 2 or 3 or more than 4 spoke portions.

In the foregoing embodiment, two of the four cores 6 of the spoke portions are coupled by the joint 11, the boss plate 8 is formed in correspondence with the joint 11, the main body 1 of the steering wheel W is placed from above the boss plate 8 in such a way that it is in registry with the joint 11, and the coupling bolt 41 is threaded into the boss plate 8 so that it is fastened to the joint 11. Alternatively, the bolt may be threaded in from the lateral side. It should also be added that the structure for mounting the joint 11 to the boss plate 8 is in no way limited to the foregoing embodiment and any other structures may be adopted, as exemplified by the use of a yoke-type boss.

Further, the boss plate 8 and the joint 11 for coupling the cores 6 of the spoke portions which are used in the foregoing embodiment are made as separate elements; alternatively, they may be formed as an integral assembly.

In the foregoing embodiment, the cores 6 of the spoke portions are made of an aluminum alloy (die-casting aluminum); alternatively, they may be made of other lightweight metals, as exemplified by magnesium. The term "ferrous metals" as used herein (to make the collar 42 and the like) includes specific examples such as a hot-rolled soft steel plate (JIS G3131), a cold-rolled steel plate (JIS G3141) and an electrogalvanized steel plate (JIS G3313).

In the foregoing embodiment, every two adjacent cores 6 of the spoke portions are coupled by the connecting cores 10A to 10D; alternatively, selected pairs of adjacent ores may be coupled by connecting cores.

In the foregoing embodiment, only one screw boss 10a is provided in the connecting core 10A; alternatively, more than one screw boss may be provided in the core.

It is also within the scope of the invention to provide a screw boss in the other connecting cores 10B, 10C and 10D.

In the foregoing embodiment, four connecting cores 10A to 10D are provided; however, the connecting core that must be provided by all means is the forward core 10A and the other connecting cores, i.e., 10B, 10C and 10D may be omitted.

Figure 14:
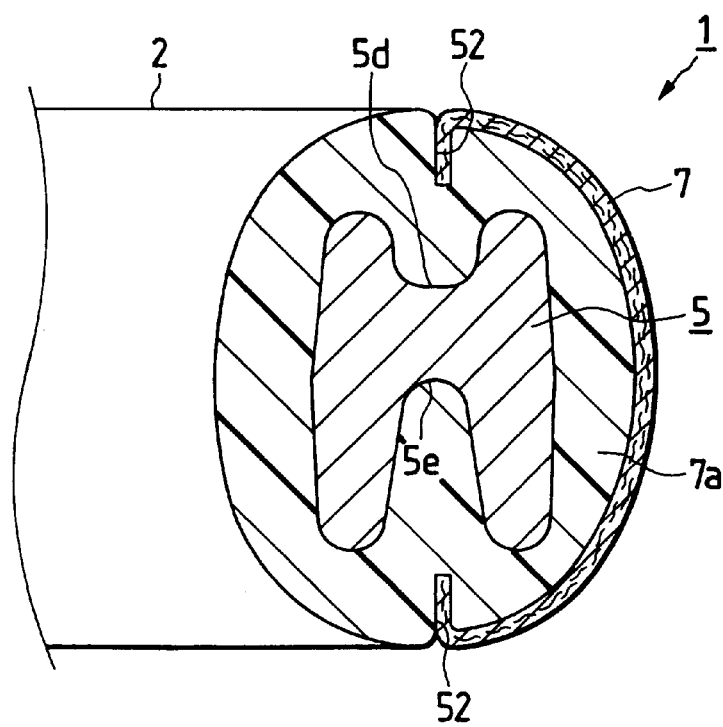
FIG. 14 is a sectional view of the ring portion in another embodiment of the invention.

In the above embodiment, the grooves 51 are formed deep into the corresponding sites of the recesses 5d and 5e in the core 5 of the ring portion 2 but they need not be formed that deep. For example, as shown in FIG. 14, grooves 52 may be formed shallow enough to extend short of the recesses 5d and 5e in the core 5 of the ring portion 2 and this alternative embodiment does not depart from the spirit and scope of the invention.

In the previous embodiment, the covers 7a and 7b and the pad portion 3 are formed integrally; alternatively, they may be formed of separate elements.

In the foregoing embodiment, the covers 7a and 7b and the pad portion 3 are made of a soft synthetic resin material (e.g. polyurethane foam) but they may be made of other materials (e.g. resin materials such as a thermoplastic elastomer and wood).

In the foregoing embodiment, the leather member 7 is installed in selected areas of the surface of the main body 1 of the steering wheel; alternatively, it may be installed in all visible areas.

In the foregoing embodiment, the leather member 7 is formed of genuine leather but it may be replaced by artificial leather.

What is claimed is:

1. A steering wheel comprising:

a ring core having a generally H-shaped cross section with at least one circumferential recess formed therein;

a cover extending over said ring core and having circumferential grooves formed in at least two sites of said cover such that said grooves extend toward said ring core; and a leather member covering at least a part of an outer surface of said cover, said leather member having edge portions and installed by fitting said edge portions into said grooves.

2. The steering wheel according to claim 1, wherein said grooves are formed deep into corresponding sites of the recesses of the H-shaped cross section of said ring core to hold said leather member firmly within said grooves.

3. The steering wheel according to claim 1, wherein said leather member comprises a genuine leather.

4. The steering wheel according to claim 1, wherein said leather member comprises an artificial leather.

5. The steering wheel according to claim 1, wherein said ring core has a generally H-shaped cross section with at least two circumferential recesses formed therein.

6. The steering wheel according to claim 1, wherein said circumferential grooves are located on opposing sides of said cover.

7. A steering wheel comprising;

an annular ring core having a top side and a bottom side and a generally H-shaped cross section with at least one circumferential recess formed therein;

a plurality of spoke cores, said spoke cores extending from said ring core toward its center;

a joint to which at least two spoke cores are connected, said joint located beneath said ring core, said joint being connected to a steering shaft;

a connecting core for coupling two adjacent ones of said spoke cores;

a cover extending over said ring core and said spoke cores having circumferential grooves formed in at least two sites of said cover such that said grooves extend toward said ring core;

a leather member covering at least a part of an outer surface of said cover, said leather member having edge portions and installed by fitting said edge portions into said grooves;

a pad portion provided substantially above said joint in generally a center of said ring core, and being formed integrally with said cover; and an air bag device disposed between said pad portion and said joint, and being secured onto at least one of said joint, said spoke cores and said connecting core, wherein at least said connecting core is formed such that an upper end of a cross section of said connecting core is directed toward said pad portion so that an opening formed by said joint and said connecting cores is large enough to insert said air bag device.

8. The steering wheel according to claim 7, wherein at least two connecting cores are provided on both sides of said opening wherein said air bag device is inserted and said at least two connecting cores are bent or curved.

9. The steering wheel according to claim 7, wherein said air bag device is secured by a screw threaded into a hole formed in at least one of said spoke cores and said connecting core, and a screw boss for said hole projects above an upper surface of said spoke cores and said connecting core so as to reduce a length of said screw boss hanging from a lower surface of said spoke cores and said connecting core, thereby securing an opening large enough to insert said air bag device.

10. The steering wheel according to claim 7, wherein said ring core has a generally H-shaped cross section with at least two circumferential recesses formed therein.

11. The steering wheel according to claim 7, wherein said circumferential grooves are located on opposing sides of said cover.

12. The steering wheel according to claim 8, wherein said air bag device is secured by a screw threaded into a hole formed in at least one of said spoke cores and said connecting core, and a screw boss for said hole projects above upper surface of said spoke cores and said connecting core so as to reduce a length of said screw boss hanging from a lower surface of said spoke cores and said connecting core, thereby securing an opening large enough to insert said air bag device.

13. A steering wheel comprising:

an annular ring core having a top side and a bottom side and a generally H-shaped cross section with at least one circumferential recess formed therein;

a plurality of spoke cores, said spoke cores extending from said ring core toward its center, at least two spoke cores in said plurality of spoke cores, each comprising:
an outer portion extending from said ring core at a point that is substantially forward than a steering shaft, and
an inner portion extending from an inner end of said outer portion obliquely downward as seen in a plan view;

a joint to which at least two said inner portions of said two spoke cores are connected below said ring core, said joint being connected to a steering shaft;

a cover extending over said ring core and said spoke cores having circumferential grooves formed in at least two sites of said cover such that said grooves extend toward said ring core;

a leather member covering at least a part of an outer surface of said cover, said leather member having edge portions and installed by fitting said edge portions into said grooves;

a pad portion provided substantially above said joint in generally a center of said ring core, and being formed integrally with said cover;

a connecting core for coupling two adjacent ones of said inner portions of said spoke cores so as to run along an edge profile of said pad portion; and an air bag device disposed between said pad portion and said joint, and being secured onto at least one of said joint, said spoke cores and said connecting core.

14. The steering wheel according to claim 13, wherein said spokes comprise die-cast metal.

15. The steering wheel according to claim 13, wherein said ring core has a generally H-shaped cross section with at least two circumferential recesses formed therein.

16. The steering wheel according to claim 13, wherein said circumferential grooves are located on opposing sides of said cover.

17. A steering wheel comprising:

an annular ring core having a top side and a bottom side and a generally H-shaped cross section with at least one circumferential recess formed therein;

a plurality of spoke cores, said spoke cores extending from said ring core toward its center;

a joint to which at least two spoke cores are connected below said ring core, said joint being connected to a steering shaft;

a connecting core for coupling two adjacent ones of said spoke cores;

a cover extending over said ring core and said spoke cores having circumferential grooves formed in at least two sites of said cover such that said grooves extend toward said ring core;

a leather member covering at least a part of an outer surface of said cover, said leather member having edge portions and installed by fitting said edge portions into said grooves;

a pad portion provided substantially above said joint in generally a center of said ring core, and being formed integrally with said cover;

an air bag device disposed between said pad portion and said joint, and being secured onto at least one of said joint, said spoke cores and said connecting core; and a screw boss formed integrally with said connecting core at an exterior position thereof in view of an area in which an air bag of said air bag device is disposed.

18. The steering wheel according to claim 17, wherein said connecting core having said screw boss is formed in a substantially line.

19. The steering wheel according to claim 17, wherein said connecting core having said screw boss is positioned at a hinge portion of said pad portion when the air bag is inflated.

20. The steering wheel according to claim 17, wherein said ring core has a generally H-shaped cross section with at least two circumferential recesses formed therein.

21. The steering wheel according to claim 17, wherein said circumferential grooves are located on opposing sides of said cover.

22. The steering wheel according to claim 18, wherein said connecting core having said screw boss is positioned at a hinge portion of said pad portion when the air bag is inflated.

* * * * *